US009143991B2

(12) United States Patent  
Chen et al.

(10) Patent No.: US 9,143,991 B2
(45) Date of Patent: Sep. 22, 2015

(54) SEAMLESS HANDOVER OF A MOBILE STATION FROM A MACRO BASE STATION TO A PRIVATELY ACCESSIBLE FEMTO BASE STATION

(75) Inventors: Wei-Peng Chen, Santa Clara, CA (US); Chenxi Zhu, Santa Clara, CA (US); Yuji Kojima, Kawasaki (JP)

(73) Assignee: Fujitsu Limited, Kawasaki-shi (JP)

(*) Notice: Subject to any disclaimer, the term of this patent is extended or adjusted under 35 U.S.C. 154(b) by 1776 days.

(21) Appl. No.: 12/368,366

(22) Filed: Feb. 10, 2009

(65) Prior Publication Data

US 2009/0310559 A1    Dec. 17, 2009

Related U.S. Application Data

(60) Provisional application No. 61/061,462, filed on Jun. 13, 2008.

(51) Int. Cl.
*H04W 36/00* (2009.01)
*H04W 84/04* (2009.01)

(52) U.S. Cl.
CPC ........ *H04W 36/0055* (2013.01); *H04W 84/045* (2013.01)

(58) Field of Classification Search
CPC ................ H04W 36/0055; H04W 84/045
USPC ............... 455/432.1–453, 411, 410, 424; 370/328–329, 331–332, 338; 709/229, 709/227, 228; 726/2–6, 12, 27–30
See application file for complete search history.

(56) References Cited

U.S. PATENT DOCUMENTS

| | | | |
|---|---|---|---|
| 7,363,379 B2 * | 4/2008 | Tejaswini et al. | 709/227 |
| 2006/0142009 A1 * | 6/2006 | Takaki | 455/436 |
| 2006/0148479 A1 * | 7/2006 | Park et al. | 455/437 |
| 2006/0199582 A1 | 9/2006 | Giacalone | 455/434 |
| 2006/0281462 A1 | 12/2006 | Kim et al. | 455/436 |
| 2007/0135125 A1 * | 6/2007 | Kim et al. | 455/436 |
| 2007/0140163 A1 | 6/2007 | Meier et al. | |
| 2007/0160017 A1 | 7/2007 | Meier et al. | |
| 2008/0095067 A1 | 4/2008 | Rao | |
| 2009/0092080 A1 * | 4/2009 | Balasubramanian et al. | 370/328 |

(Continued)

OTHER PUBLICATIONS 802.163™ IEEE Standard for Local and Metropolitan Area Networks—Part 16: Air Interface for Fixed and Mobile Broadband Wireless Access Systems—Amendment 2: Physical and Medium Access Control Layers for Combined Fixed and Mobile Operation in Licensed Bands and Corrigendum 1, dated Feb. 28, 2006, 859 pages.

(Continued)

*Primary Examiner* — Babar Sarwar
(74) *Attorney, Agent, or Firm* — Baker Botts L.L.P.

(57) ABSTRACT

In an embodiment, a method is provided that includes receiving a handover request for a mobile station to be handed over to a macro base station. Identification information for the mobile station is received. The identification of the mobile station is compared with stored association information that includes identification information of a femto base station, and identification information for a particular mobile station. The method further includes identifying that the mobile station identification information matches the identification information for an associated mobile station using the stored association information. The information regarding the associated femto base station is transmitted to the associated mobile station.

17 Claims, 5 Drawing Sheets

(56) References Cited

U.S. PATENT DOCUMENTS

| | | | | |
|---|---|---|---|---|
| 2009/0092097 A1* | 4/2009 | Nylander et al. | ............. | 370/331 |
| 2009/0231191 A1* | 9/2009 | Wu et al. | .................. | 342/357.09 |
| 2010/0260068 A1* | 10/2010 | Bhatt et al. | .................... | 370/254 |
| 2012/0014353 A1* | 1/2012 | Marinier et al. | ............. | 370/331 |

OTHER PUBLICATIONS

WiMAX Forum Network Architecture (Stage 2: Architecture Tenets, Reference Model and Reference Points) [WiMAX Interworking with DSL], Release 1, Version 1.2, dated Jan. 11, 2008, 8 pages.

WiMAX Forum Network Architecture (Stage 2: Architecture Tenets, Reference Model and Reference Points) [3GPP—WiMAX Interworking], Release 1, Version 1.2, dated Jan. 11, 2008, 10 pages.

WiMAX Forum Network Architecture (Stage 2: Architecture Tenets, Reference Model and Reference Points) [3GPP2—WiMAX Interworking], Release 1, Version 1.2, dated Jan. 11, 2008, 10 pages.

WiMAX Forum Network Architecture (Stage 2: Architecture Tenets, Reference Model and Reference Points) [Stage 2 and Stage 3 Abbreviations], Release 1, Version 1.2, dated Jan. 11, 2008, 9 pages.

WiMAX Forum Network Architecture (Stage 2: Architecture Tenets, Reference Model and Reference Points) [Part 0], Release 1, Version 1.2, dated Jan. 11, 2008, 8 pages.

WiMAX Forum Network Architecture (Stage 2: Architecture Tenets, Reference Model and Reference Points) [Part 1], Release 1, Version 1.2, dated Jan. 11, 2008, 36 pages.

WiMAX Forum Network Architecture (Stage 2: Architecture Tenets, Reference Model and Reference Points) [Part 2], Release 1, Version 1.2, dated Jan. 11, 2008, 160 pages.

WiMAX Forum Network Architecture (Stage 2: Architecture Tenets, Reference Model and Reference Points) [Part 3 Informative Annex], Release 1, Version 1.2, dated Jan. 11, 2008, 28 pages.

WiMAX Forum Network Architecture (Stage 3: Detailed Protocols and Procedures), Release 1, Version 1.2, dated Jan. 11, 2008, 571 pages.

WiMAX Forum Network Architecture (Stage 3: Detailed Protocols and Procedures), [Annex: WiMAX—3GPP2 Interworking], Release 1, Version 1.2, dated Jan. 11, 2008, 16 pages.

WiMAX Forum Network Architecture (Stage 3: Detailed Protocols and Procedures), [Annex: WiMAX—3GPP Interworking], Release 1, Version 1.2, dated Jan. 11, 2008, 11 pages.

WiMAX Forum Network Architecture (Stage 3: Detailed Protocols and Procedures), [Annex: Prepaid Accounting] Release 1, Version 1.2, dated Jan. 11, 2008, 43 pages.

WiMAX Forum Network Architecture (Stage 3: Detailed Protocols and Procedures), [Annex: R6/R8 ASN Anchored Mobility Scenarios] Release 1, Version 1.2, dated Jan. 11, 2008, 15 pages.

United States Office Action; U.S. Appl. No. 12/392,238; pp. 24, May 23, 2011.

United States Final Office Action; U.S. Appl. No. 12/392,238; pp. 19, Dec. 16, 2011.

United States Advisory Action; U.S. Appl. No. 12/392,238; pp. 3, Mar. 13, 2012.

* cited by examiner

SEAMLESS HANDOVER OF A MOBILE STATION FROM A MACRO BASE STATION TO A PRIVATELY ACCESSIBLE FEMTO BASE STATION

RELATED APPLICATION

This application claims benefit under 35 U.S.C. §119(e) of U.S. Provisional Application Ser. No. 61/061,462, titled "Handover Between Macro Base Stations and Femto-Base Stations," filed Jun. 13, 2008, by Wei-Peng Chen et al.

TECHNICAL FIELD

The present invention relates generally to wireless networking, and more particularly to seamless handover of a mobile station from a macro base station to a privately accessible femto base station.

BACKGROUND

IEEE 802.16 is an emerging suite of standards for Broadband Wireless Access (BWA) commonly known as WiMAX. WiMAX is one of the wireless technologies targeting the fourth generation of wireless mobile systems. The IEEE 802.16e amendment to the IEEE 802.16 base specification enables combined, fixed, and mobile operation in licensed and license-exempted frequency bands under 11 GHz. IEEE 802.16 defines a high-throughput packet data network radio interface capable of supporting several classes of Internet Protocol (IP) applications and services including isochronous applications such as Voice Over IP (VoIP) and applications with burst data access profiles such as Transfer Control Protocol (TCP) applications. The standards defined in IEEE 802.16-2004 and IEEE 802.16-2005 are both hereby incorporated by reference.

The basic WiMAX network coverage is provided using an approach similar to other mobile wireless technologies (e.g., using high power macro base stations). In order to increase the intra-cell coverage and capacity distributed small base station entities have been considered. Depending on the number of target users and the type of applications envisioned, these small base station entities have been defined by the WiMAX industry as nano, pico or femto base stations. Relay stations (RS) have also been introduced to extend radio coverage or to increase the throughput of a macro base station (MBS). An RS, which transfers data of active service flows between an MBS and mobile stations (MS), may be a low-cost alternative to an MBS.

The femto base station (fBS) is the smallest base station entity. An fBS is, in essence, a small WiMAX MBS that a user can purchase and install in his home or office. It basically provides the user's MS the same air interface function as an MBS based on the IEEE 802.16 standard. Compared to a MBS, the fBS is a low-cost, low-power radio system having reduced capabilities. The users can put the FBS in their building to boost bandwidth and coverage area and enable new applications such as fixed/mobile convergence. Being located in the user's building, the fBS often provides higher signal strength and better link quality than the MS would get from the MBS outside the user's building.

The fBS is envisioned as being installed at the customer's premise by the customer with little or no support from the network operator. This is different than other types of small base station entities, which are typically installed and commissioned by the network operator. Since fBSs are operated in a home or office environment, it is natural to consider fBSs as private equipment which is only accessible by the owners' devices. However, in certain situations the owners of fBSs may provide service to the MSs of non-owners. Such fBSs may be referred to as public accessible fBSs.

SUMMARY

The teachings of the present disclosure relate to seamless handover of a mobile station from a macro base station to a privately accessible femto base station that includes receiving a handover request for a femto base station to handover service of a mobile station to a macro base station. The method continues by receiving identification information for the femto base station. Association information is created by associating the identification information for the femto base station with the mobile station. The identification information for the femto base station and the association information is stored.

In another embodiment, a method is provided that includes receiving a handover request for a mobile station to be handed over to a macro base station. Identification information for the mobile station is received. The identification of the mobile station is compared with stored association information that includes identification information of a femto base station, and identification information for a particular mobile station. The method further includes identifying that the mobile station identification information matches the identification information for an associated mobile station using the stored association information. The information regarding the associated femto base station is transmitted to the associated mobile station.

Technical advantages of particular embodiments include reduction of latency for handover of a mobile station from a macro base station to a privately accessible femto base station. Additionally, no changes may be necessary to mobile station's hardware or software to be able to support expediting handover operations to femto base stations. The handover process may be self-learning and autonomous without the need to manually configure the macro or femto base stations. Other technical advantages of particular embodiments include increased capacity and load balance between macro and femto base stations servicing mobile stations in a wireless network.

Other technical advantages will be readily apparent to one of ordinary skill in the art from the following figures, descriptions, and claims. Moreover, while specific advantages have been enumerated above, various embodiments may include all, some, or none of the enumerated advantages.

BRIEF DESCRIPTION OF THE FIGURES

For a more complete understanding of particular embodiments and their advantages, reference is now made to the following description, taken in conjunction with the accompanying drawings, in which.

DETAILED DESCRIPTION

Figure 1:
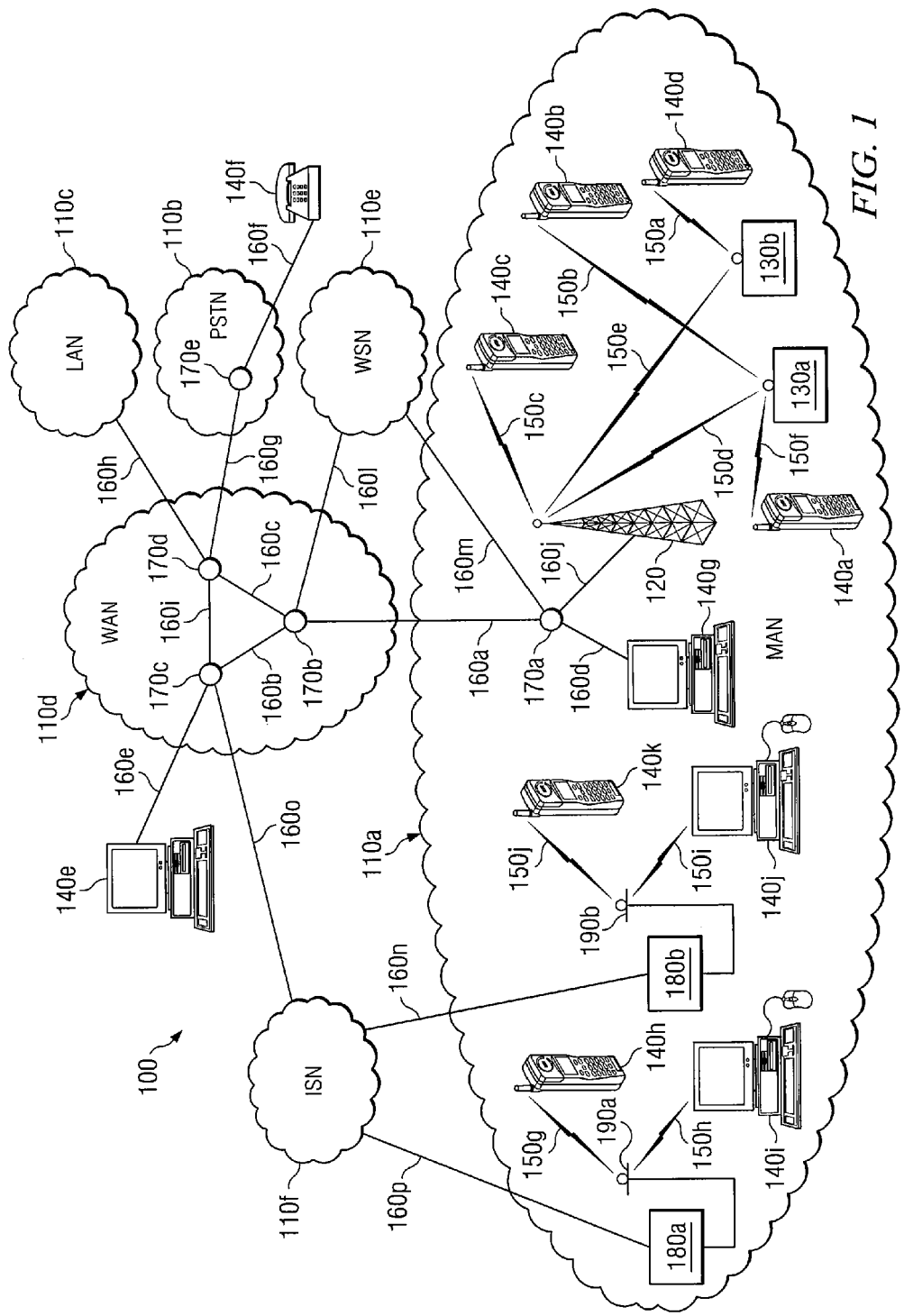
FIG. 1 illustrates a communication system comprising various communication networks, in accordance with a particular embodiment.

FIG. 1 illustrates a communication system comprising various communication networks, in accordance with a particular embodiment. Communication system 100 may be comprised of multiple networks 110. Each network 110 may be any of a variety of communication networks designed to facilitate one or more different services either independently or in conjunction with other networks. For example, networks 110 may facilitate Internet access, wireless access (e.g., a WiMAX service) online gaming, file sharing, peer-to-peer file sharing (P2P), voice over Internet protocol (VoIP) calls, video over IP calls, or any other type of functionality typically provided by a network. Networks 110 may provide their respective services using any of a variety of protocols for either wired or wireless communication. For example, network 110a may comprise an 802.16 wireless network (e.g., 802.16j), popularly known as WiMAX, which may include macro base stations (MBSs), such as MBS 120, relay stations (RSs), such as RSs 130, and femto base stations (fBSs), such as fBSs 190.

For simplicity and ease of discussion the remainder of this description may use a simplified nomenclature for the various entities that may be involved. 'Owner' may refer to the entity that has purchased an fBS or to whom the fBS is registered. 'User' may refer to the entity that is consuming wireless resources. 'Access service' may refer to the service that the owner uses to access external networks, such as the Internet. 'Access service provider' or 'Internet service provider' (ISP) may refer to the entity that provides the access service for the owner. 'Carrier service' may refer to the service that the user uses for wireless access, such as WiMAX. 'Carrier service provider' or 'wireless service provider' (WSP) may refer to the entity that provides the carrier service for the user. While this nomenclature is used for simplicity, it does not represent the entire scope of all possible embodiments. For example, an owner may also be a user and the ISP may also be the carrier service provider. As another example, the ISP may not be directly providing the owner with Internet access (e.g., the ISP may provide a building with Internet access, the building owner may then provide the fBS owner with Internet access).

The embodiment depicted in FIG. 1 includes fBSs 190. fBSs 190 may, in essence, be small base stations purchased (or leased) by the owner. The owner is then responsible for installing the fBS, for example at his premise. Once installed the fBS provides a geographically small coverage area that may be used to enhance the signal coverage within the owner's premise. Depending on the scenario, the owner may share this coverage with other, unknown users (e.g., the fBS is a public fBS), or he may limit it to known/authorized users (e.g., the fBS is a private fBS).

Part of the installation process may include providing the fBS with network access for its backhaul connection. As can be seen in FIG. 1, fBSs 190 are connected to network access devices 180. This connection provides fBSs 190 with their backhaul connection to the carrier service provider's network, network 110e. Network access devices 180 may provide the owner with general network access. As may be apparent, fBSs 190 do not use dedicated back-haul communication lines but rather use the owner's existing network access. Depending on the embodiment and scenario the ISP and the WSP may be the same entity.

While fBSs 190 may use the owner's existing network access, similar to a traditional wireless access point, as a user leaves the fBS's coverage area they may be handed-off to RS 130 or MBS 120. The hand-off may be possible because the user's MS is able to use the same wireless interface with fBS 190 and RS 130 or MBS 120. Furthermore, unlike a traditional WiFi wireless access point, operated in a license-exempt band, the fBS may be operated in a licensed band.

Within a network using a wireless protocol (e.g., 802.16j, or 802.16m), such as network 110a, particular embodiments may allow for fBSs 190 to be public or private. A public fBS may allow any of endpoints 140 to connect thereto; a private fBS may only allow connections from those endpoints 140 who are authorized to connect thereto. For example, fBS 190a may be a private fBS that the owner has installed in his home. The owner of fBS 190a may have authorized endpoints 140h and 140i (which may, for example be his phone (e.g., a mobile phone) and his computer (depicted as a phone in FIG. 1)) to connect to fBS 190a. Accordingly, only these two endpoints may connect to fBS 190a. On the other hand, fBS 190b may be a public fBS, installed at a business. Accordingly, any of endpoints 140 within the coverage area of fBS 190b may connect thereto.

Figure 3A:
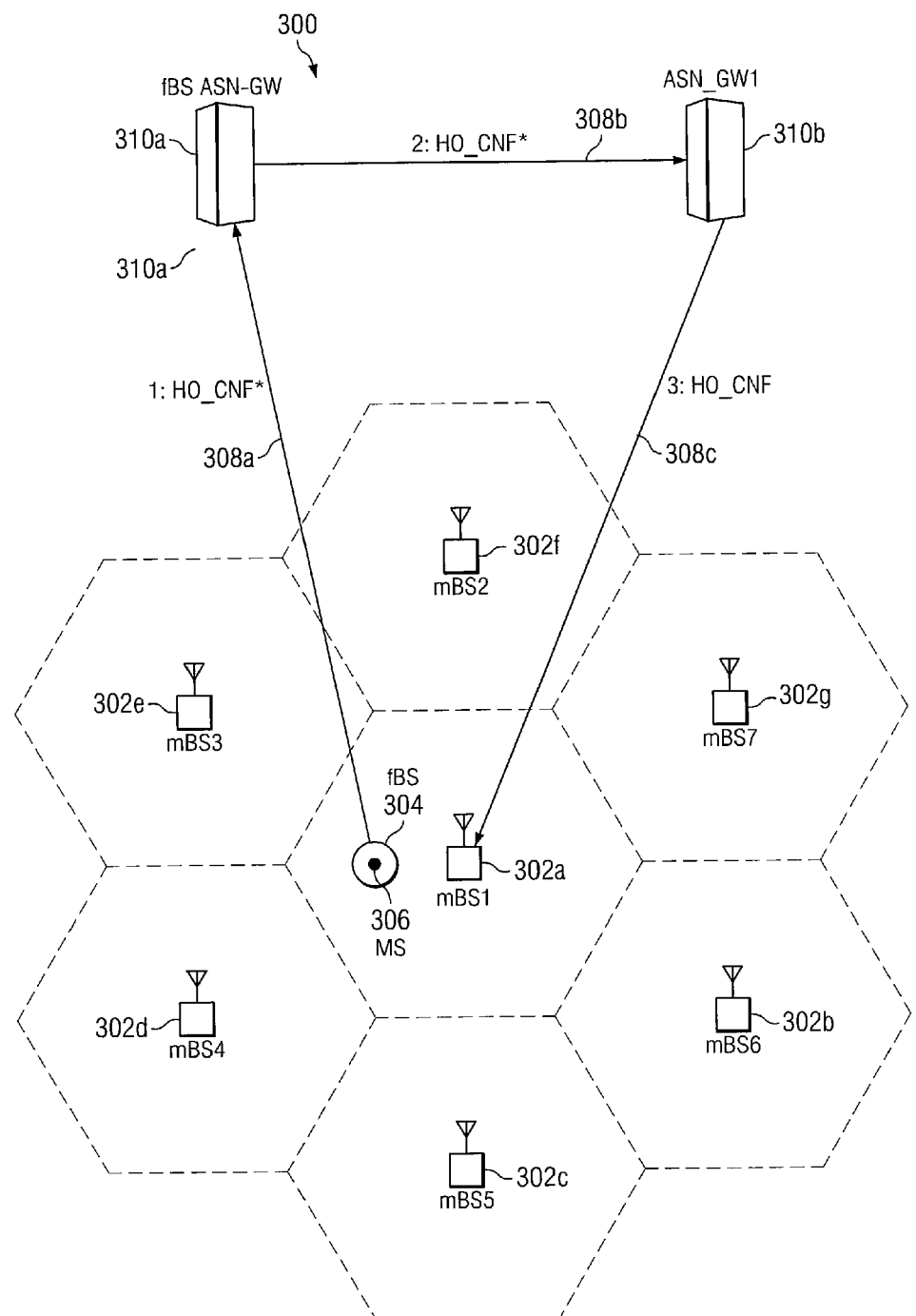
FIGS. 3A and 3B illustrate portions of a technique for seamless handover between a macro base station and privately accessible femto base stations in a WiMAX system.
Figure 3B:
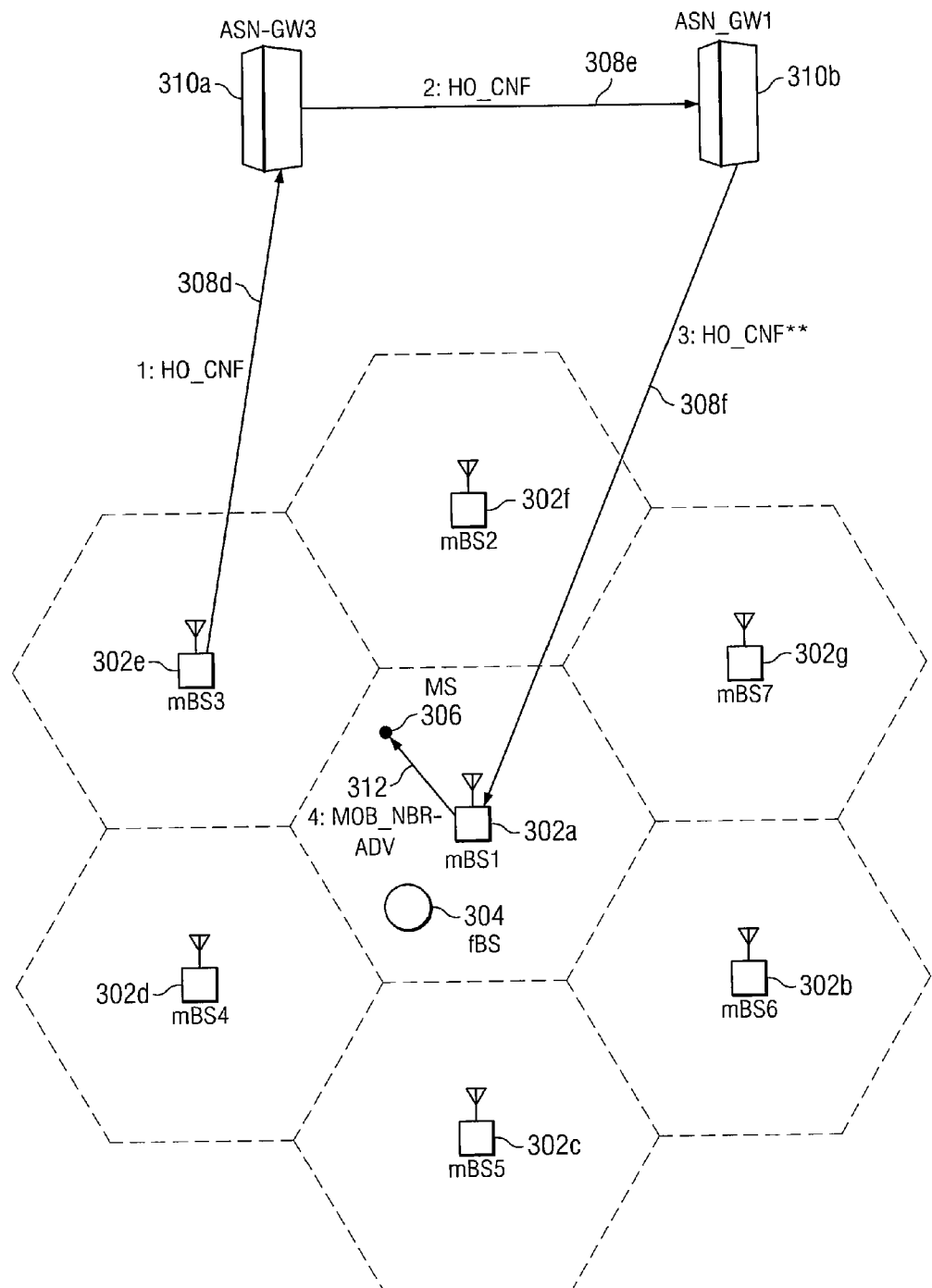

In certain embodiments, it is desirable to provide a seamless connection to fBS 190. A method, described in further detail with respect to FIGS. 3A and 3B, provides the ability for endpoints 140 to connect to fBS 190 while minimizing latency and scan times. This may permit endpoints 140 to connect to fBS in a manner that may be transparent to a user of the wireless network.

Each of endpoints 140 is connected to one of MBS 120, RSs 130, or fBSs 190. For simplicity, the component to which an endpoint is connected may be referred to as an access station. For example, the access station for endpoint 140h is fBS 190a. Between each endpoint 140 and its respective access station there may be a wireless connection 150, sometimes referred to as an access link. These wireless connections may be referred to as access links because they provide the endpoint with access to a network. Similarly, between each RS and MBS (or between two RSs) there may be a wireless connection 150, sometimes referred to as a relay link. This wireless connection may be referred to as a relay link because it relays communications from the access link to/from the MBS.

A wireless connection may comprise various wireless resources such as, for example, a combination of a particular center frequency, a particular bandwidth, a particular time slot, and/or a particular subchannel (for example, as described in a downlink or uplink map). In particular embodiments, it may be convenient to discuss the amount of resources used by a link in terms of slots. Depending on the embodiment, a slot may comprise a particular number of subchannels and symbols (also known as time slots). For example, Section 8.4.3.1 of the Institute of Electrical & Electronics Engineers (IEEE) 802.16e-2005 Standard specifies a slot comprising a single subchannel and two symbols.

An increase in the number of wireless connections 150 within a given area may increase the impact and severity of interference between wireless connections 150. Accordingly, it may be desirable to know where a particular fBS has been configured. In particular embodiments, uplink sounding may be used to estimate the channel gain and interference strength between MBS 150, and multiple RSs 130 and fBSs 190. The uplink sounding may, therefore, be used in determining the quality and/or efficiency of the various wireless connections.

In particular embodiments, endpoints 140 may select which access station (e.g., one of MBS 120, RSs 130, or fBSs 190) to connect to based on, at least in part, the spectrum efficiency of an access link with the respective access station.

The spectrum efficiency may be determined using the Modulation and Coding Scheme (MCS) level which may be determined by the Carrier to Interference-plus-Noise Ratio (CINR) of the wireless connection and may be measured in units of bits/Hz/sec. For example, a Quadrature Phase-Shift Keying (QPSK) modulated signal with code rate ½, may have a spectrum efficiency of 1 bit/Hz/second. Furthermore, depending on the embodiment, network 110a may be configured to make an fBS appear more desirable as an access station to encourage MSs to connect thereto if possible.

Although communication system 100 includes six different networks, networks 110a-110f, the term "network" should be interpreted as generally defining any network or combination of networks capable of transmitting signals, data, and/or messages, including signals, data or messages transmitted through WebPages, e-mail, text chat, voice over IP (VoIP), and instant messaging. Depending on the scope, size and/or configuration of the network, any one of networks 110a-110f may be implemented as a LAN, WAN, MAN, PSTN, WiMAX network, global distributed network such as the Internet, Intranet, Extranet, or any other form of wireless or wired networking.

Networks 110 may include any number and combination of wired links 160, wireless connections 150, nodes 170 and/or endpoints 140. For purposes of illustration and simplicity, network 110a is a MAN that may be implemented, at least in part, via WiMAX; network 110b is a PSTN; network 110c is a LAN; network 110d is a WAN, such as the Internet; network 110e is a carrier service network (CSN) which may be operated by the carrier service provider responsible for network 110a; and network 110f is an access service network (ASN) which may be operated by an Internet service provider (ISP) responsible for providing its users with Internet access. Though not depicted, both CSN network 110e and ASN network 110f may include servers, modems, gateways and an other components that may be needed to provide their respective service. While networks 110 have been depicted as six separate networks, depending on the scenario any two, or more, of the networks may be a single network. For example, the WSP and the ISP may be the same business entity which may maintain the necessary components for both services on the same network.

Generally, networks 110a, and 110c-110f provide for the communication of packets, cells, frames, or other portions of information (generally referred to as packets herein) between endpoints 140 and/or nodes 170 (described below). In particular embodiments, networks 110a, and 110c-110f may be IP networks. IP networks transmit data by placing the data in packets and sending each packet individually to the selected destination, along one or more communication paths. Network 110b may, for example, be a PSTN that may include switching stations, central offices, mobile telephone switching offices, pager switching offices, remote terminals, and other related telecommunications equipment that are located throughout the world. Network 110d may be coupled to network 110b through a gateway. Depending on the embodiment, the gateway may be a part of network 110b and/or 110d (e.g., nodes 170e or 170c may comprise a gateway). The gateway may allow PSTN 110b to be able to communicate with non-PSTN networks such as any one of networks 110a or 110c-110f.

Any of networks 110a or 110c-110f may be coupled to other IP networks including, but not limited to, the Internet. Because IP networks share a common method of transmitting data, signals may be transmitted between devices located on different, but interconnected, IP networks. In addition to being coupled to other IP networks, any of networks 110a or 110c-110f may also be coupled to non-IP networks through the use of interfaces or components such as gateways.

Networks 110 may be connected to each other and with other networks via a plurality of wired links 160, wireless connections 150, and nodes 170. Not only do the wired links 160, wireless connections 150, and nodes 170 connect various networks but they also interconnect endpoints 140 with one another and with any other components coupled to or a part of any of networks 110. The interconnection of networks 110 may enable endpoints 140 to communicate data and control signaling between each other as well as allowing any intermediary components or devices to communicate data and control signals. Accordingly, users of endpoints 140 may be able to send and receive data and control signals between and among each network component coupled to one or more of networks 110.

As noted above, wireless connections 150 may represent wireless links between two components using, for example, WiMAX. The extended range of a WiMAX MBS along with one or more RSs and fBSs may allow network 110a to cover the larger geographic area associated with a MAN while using a relatively small number of wired links. More specifically, by properly arranging MBS 120, multiple RSs 130 and fBSs 190 around a metropolitan area, the multiple access stations may use wireless connections 150 or existing wired links to communicate with MBS 120, and wireless connection 150 to communicate with wireless endpoints 140 throughout the metropolitan area. Then MBS 120 may, through wired connection 160a, communicate with other MBSs, any components of network 110e, any network components not capable of establishing a wireless connection, and/or other networks outside of the MAN, such as network 110d or the Internet.

As mentioned above, the coverage quality of network 110a may be enhanced through the use of fBSs 190. More specifically, the relatively reduced range of a WiMAX fBS may allow network 110a to provide improved signal quality and/or capacity to users within smaller areas, for example within a building. fBSs 190 may be able to provide their access links through the use of existing network access. More specifically, fBSs 190 may connect to the owner's network access device 180. Once connected, fBS 190 may use the owner's network access, provided by the owner's ISP's network (e.g., network 110f), for its backhaul connection to the carrier service provider's network (e.g., network 110e).

Nodes 170 may include any combination of network components, modems, session border controllers, gatekeepers, ASN gateways, CSN gateways, security gateways, operation administration maintenance and provisioning (OAM&P) servers, network access provider (NAP) servers, base stations, conference bridges, routers, hubs, switches, gateways, endpoints, or any other hardware, software, or embedded logic implementing any number of communication protocols that allow for the exchange of packets in communication system 100. For example, node 170a may comprise another MBS that is wired to MBS 120 via link 160j and to network 110d via link 160a. As a MBS, node 170a may be able to establish several wireless connections of its own with various other MBSs, RSs, and/or endpoints. As another example, node 170e may comprise a gateway. As a gateway node 170e may allow network 110b, a PSTN network, to be able to transmit and receive communications from other non-PSTN networks, such as network 110d, an IP network. More specifically, as a gateway, Node 170e works to translate communications between the various protocols used by different networks.

Network access devices 180 may provide network access to fBSs 190 through any combination of hardware, software embedded in a computer readable medium, and/or encoded logic incorporated in hardware or otherwise stored (e.g., firmware). In particular embodiments, network access device 180 may be supplied by the owner's ISP. For example, if the owner's ISP is a cable company then the ISP may supply a cable modem as the network access device 180. As another example, if the owner's ISP is a phone company then the ISP may supply an XDSL modem as the network access device 180. As may be apparent, network access device 180 may provide network access to components other than fBSs 190. For example, the owner may connect his personal computer to network access device 180 to surf the Internet.

Endpoints 140 and/or nodes 170 may provide data or network services to a user through any combination of hardware, software embedded in a computer readable medium, and/or encoded logic incorporated in hardware or otherwise stored (e.g., firmware). For example, endpoints 140a-140k may include a cell phone, an IP telephone, a computer, a video monitor, a camera, a personal data assistant or any other hardware, software and/or encoded logic that supports the communication of packets (or frames) using networks 110. Endpoints 140 may also include unattended or automated systems, gateways, other intermediate components or other devices that can send or receive data and/or signals.

Although FIG. 1 illustrates a particular number and configuration of endpoints, connections, links, and nodes, communication system 100 contemplates any number or arrangement of such components for communicating data. In addition, elements of communication system 100 may include components centrally located (local) with respect to one another or distributed throughout communication system 100.

Figure 2:
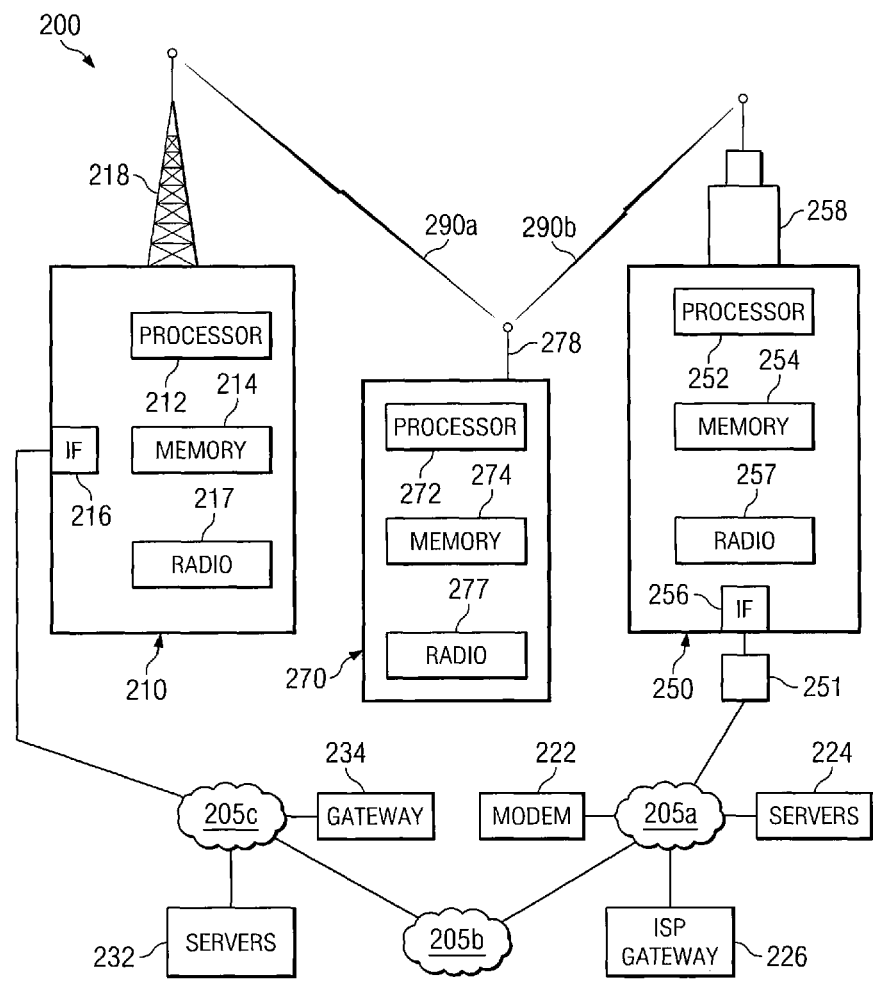
FIG. 2 illustrates a wireless network comprising a more detailed view of an endpoint, a macro base station and a femto base station, in accordance with a particular embodiment.

FIG. 2 illustrates a wireless network comprising a more detailed view of an endpoint, a MBS and a fBS, in accordance with a particular embodiment. More specifically, the depicted embodiment is a simplified network comprising networks 205, MBS 210, fBS 250 and endpoint 270. In different embodiments network 200 may comprise any number of wired or wireless networks, MBSs, endpoints, RSs, fBSs, and/or any other components that may facilitate or participate in the communication of data and/or signals whether via wired or wireless connections. MBS 210 and fBS 250 comprise processors 212 and 252, memory 214 and 254, communication interfaces 216 and 256, radios 217 and 257 and antennas 218 and 258. Similarly, endpoint 270 comprises processor 272, memory 274, radio 277, and antenna 278. These components may work together in order to provide wireless networking functionality, such as providing wireless connections in a wireless network (e.g., a WiMAX wireless network).

Networks 205 may comprise separate but interconnected networks operated by one or more different operators. More specifically, network 205a may be the ISP's network. The owner of fBS 250 may use network 205a for network access, such as to the Internet. In providing the owner with network access, the ISP's network 205a may include modem 222, servers 224, and ISP gateway 226. Modem 222 may be used by the ISP to communicate with the owners modem 251. Thus, modem 251 and modem 222 may have complementary hardware and/or software that may enable them to communicate data between one another. Modem 222 may act as a gateway between the ISP's network 205a and the owner's modem 251. In particular embodiments, modem 222 may contain security gateway functionality. Servers 224 may comprise one or more servers such as OAM&P servers, Authentication, Authorization and Accounting (AAA) servers, Dynamic Host Configuration Protocol (DHCP) servers, or any other servers that the ISP may need to provide the owner with network access (or any other features provided by the ISP). ISP gateway 226 may comprise any hardware and/or software needed to couple network 205a with network 205b. This may include any hardware and/or software needed to implement security functionality (e.g., a secure tunnel or a virtual private network (VPN) connection).

Network 205c may be a WiMAX service provider's network. Depending on the scenario, network 205c may be the user's or the owner's WiMAX service provider's network. In providing the WiMAX service, network 205c may utilize servers 232 and gateway 234. Servers 232 may comprise one or more servers such as OAM&P servers, Network Access Provider (NAP) servers, AAA servers, Self Organizing Network (SON) servers or any other servers that the WiMAX provider may need to configure/authenticate fBS 250 and provide users with WiMAX service. Gateway 234 may comprise any hardware and/or software needed to couple network 205c with network 205b. For example, in particular embodiments, gateway 234 may comprise a security gateway and, behind the security gateway, an ASN gateway. The security gateway and ASN gateway may share all, some, or none of the same hardware components. Gateway 234 may also include security functionality for providing a secure tunnel or VPN connection between fBS 250 and gateway 234. This security functionality may be important to prevent the "snooping" of transmissions from fBS 250 to gateway 234. This may occur when the ISP is a different entity than the WiMAX service provider.

Networks 205a and 205c may be coupled via network 205b. In some embodiments, network 205b may be the Internet. Thus, in such embodiments, fBS 250 may connect to the WSP's network, network 205c, via the Internet. MBS 210 may be coupled to a different gateway 234 than fBS 250. Though network 205b is depicted as a single network, it may comprise any number of the networks described above with respect to FIG. 1. For example, network 205b may comprise the Internet, a LAN, WAN, MAN, PSTN or some combination of the above.

Processors 212, 252 and 272 may be microprocessors, controllers, or any other suitable computing devices, resources, or combinations of hardware, software and/or encoded logic operable to provide, either alone or in conjunction with other components, (e.g., memory 214, 254, and/or 274) wireless networking functionality. Such functionality may include providing various wireless features discussed herein. For example, processors 212, 252 and 272 may be able to determine the spectrum efficiency of one or more of wireless connections 290a and/or 290b. Additional examples and functionality provided, at least in part, by processors 212, 252 and 272 will be discussed below.

Memory modules 214, 254, and 274 may be any form of volatile or non-volatile memory including, without limitation, magnetic media, optical media, random access memory (RAM), read-only memory (ROM), flash memory, removable media, or any other suitable local or remote memory component or components. Memory modules 214, 254, and 274 may store any suitable data, instructions, logic or information utilized by MBS 210, fBS 250, and endpoint 270, respectively, including software embedded in a computer readable medium, and/or encoded logic incorporated in hardware or otherwise stored (e.g., firmware). For example, in particular embodiments, memory modules 214, 254, and 274 may store information regarding the spectrum efficiency of one or more particular links. Memory modules 214, 254, and 274 may also maintain a list, database, or other organization of data useful for determining how to route data to the proper component. For example, in some embodiments a tree structure (as opposed to a mesh structure) may be used in routing data from an endpoint to a MBS. More specifically, there may be a known path from MBS 210 to endpoint 270b. This path, or a portion thereof, may be stored in one or more of memory modules 214, 254, and 274. Additional examples of information stored by memory modules 214, 254, and 274 will be discussed below.

Radios 217, 257, and 277 may be coupled to or a part of antennas 218, 258, and 278, respectively. Radios 217, 257, and 277 may receive digital data that is to be sent out to other MBSs, fBSs, RSs and/or endpoints via a wireless connection. Radios 217, 257, and 277 may convert the digital data into a radio signal having the appropriate center frequency and bandwidth parameters. These parameters may be predetermined, for example, by a combination of processor 212 and memory 214 of MBS 210. The radio signal may then be transmitted via antennas 218, 258, and 278 to the appropriate recipient. Similarly, radios 217, 257, and 277 may convert radio signals received via antennas 218, 258, and 278, respectively, into digital data to be processed by processors 212, 252, or 272, as appropriate.

Antennas 218, 258, and 278 may be any type of antenna capable of transmitting and receiving data and/or signals wirelessly. In some embodiments, antennas 218, 258, and 278 may comprise one or more omni-directional, sector or panel antennas operable to transmit/receive radio signals between 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. Together, radio 217 and antenna 218, radio 257 and antenna 258, and radio 277 and antenna 278 may each form a wireless interface.

Communication interfaces 216 and 256 may be used for the wired communication of signaling and/or data between MBS 210 and networks 205, and between fBS 250 and networks 205. For example, communication interface 216 may perform any formatting or translating that may be needed to allow MBS 210 to send and receive data from network 205c over a wired connection. As another example, communication interface 256 may comprise an interface (e.g., RJ-45) that is compatible with a corresponding interface on modem 251, such as an Ethernet interface. While not depicted, endpoint 270 may also include wired interfaces.

As noted above with respect to fBSs 190, fBS 250 may, in essence, be a small base station providing a limited coverage area for a home or office. Depending on the embodiment and configuration of fBS 250 it may be public or private. fBS 250 may rely on the user's network access, via modem 251, to provide the backhaul connection to network 205c, as opposed to the WiMAX service provider supplying the backhaul connection as is the case with MBS 210.

Modem 251 may be used to provide the owner's network access which fBS 250 may utilize for its backhaul connection to WiMAX network 205c. Depending on the type of network service and/or the user's service provider, modem 251 may be a cable modem, a digital subscriber line (DSL) modem, a fiber optic modem, or any other modem, gateway or network access device provided by the owner's network service provider. As may be apparent, the owner may have any number of routers, switches and/or hubs between fBS 250 and modem 251.

As part of establishing a backhaul connection, fBS 250 may communicate with modem 251. Modem 251, which may be provided or authorized by the user's ISP may provide fBS 250 with access to the ISP's network 205a which may then allow access to network 205c, via network 205b. Accessing network 205a may involve modem 251 communicating with the ISP's modem 222.

The ISP may operate one or more servers (e.g., OAM&P, AAA, DHCP) in providing the user with network access. For example, the user may have a digital subscriber line (DSL) account for network access with a DSL provider. Servers 224 may ensure that the user has paid his bills and is otherwise in good standing with the DSL provider.

ISP gateway 226 may connect ISP network 205a with the Internet (e.g., network 205b). This may allow fBS 250 to access WiMAX network 205c via the Internet. In connecting network 205a with the Internet, gateway 226 may perform any necessary formatting and/or security functions.

WIMAX network 205c may have its own gateway 234 and servers 232. Similar to the servers and gateways of ISP network 205a, gateway 234 and servers 232 may ensure that the user has a valid WiMAX account and that network 205c is able to access network 205b. Servers 232 may also contain information, data, instructions and/or logic that may be used to provision various features and functionality of fBS 250. For example, they may provide fBS 250 with channel information for its wireless connection 290b with endpoint 270.

Endpoints 270 may be any type of wireless endpoints able to send and receive data and/or signals to and from MBS 210 and/or fBS 250. Some possible types of endpoints 270 may include desktop computers, PDAs, cell phones, smart phones, laptops, and/or VoIP phones.

The following example may help to illustrate how these components inter-work with one another to provide the functionality of particular embodiments. In certain embodiments, MBS 210 and/or fBS 250 transmit association information to components in network 205. The association information may relate to certain associations between endpoint 270 and fBS 250 to facilitate seamless handover of service of endpoint 270. Further network 205 may transmit this association information to other components in network 205 as needed.

Thus far several different embodiments and features have been presented. Particular embodiments may combine one or more of these features depending on operational needs and/or component limitations. This may allow for great adaptability of network 200 to the needs of various organizations and users. For example, a particular embodiment may use several MBSs to provide wireless access for a metropolitan area, or a single MBS may be used with several RSs to provide the necessary coverage. Furthermore, in some embodiments, fBS 250 may have more or less radios. Some embodiments may include additional features.

FIGS. 3A and 3B illustrate portions of a technique for seamless handover between a macro base station and privately accessible femto base stations in a WiMAX system. Specifically, FIGS. 3A and 3B illustrate a portion of a WiMAX or other wireless network that includes a number of adjacent macro base stations 302, a femto base station 304, and a mobile station 306. Additionally, the illustration of the network includes messages 308 to and from ASN gateways 310. FIG. 3A illustrates a technique for an association establishment of MS 306 with fBS 304 and a particular home MBS 302a. FIG. 3B illustrates a technique for using the association information from FIG. 3A.

A MS 306 is mobile and may move from place to place necessitating handovers from base station to base station. However, MS 306 generally has a "home" or a base station where it spends a majority of time. In systems that consist of only MBSs 302, the concept of a "home" base station is largely unnecessary. However, with the introduction of fBSs 304, thinking of a particular fBS 304 as the home base station may be helpful. A goal of having fBSs 304 is the ability to redirect some of the network traffic from MBSs 302 to fBSs 304. Often a particular MS 306 may be associated with a particular fBS 304. This particular fBS 304 would then be designated the "home" fBS 304 for that particular MS 306. A home MBS 302a may also be designated. Home MBS 302a may have an overlapping coverage area with the coverage area of home fBS 304. In general, a home MBS 302a may be a MBS 302 to which home fBS 304 may handover service of a MS 306. There may be more than one home MBS 302a for a corresponding home fBS 304. For purposes of this disclosure only, it is assumed that the illustrated MS 306 has a single corresponding home fBS 304 and home fBS 304 has a single corresponding home MBS 302a.

In general, the handover procedure, from a fBS to another fBS or a MBS utilizes neighbor topology advertisement from the fBS and/or MS scanning procedures along with certain associated processes. The handover procedure including PHY and MAC operations over an R1 interface as defined in IEEE standard for local metropolitan area networks, part 16, amendment 2 and corrigendum 1 and network operations over R4/R6/R8 interfaces as defined in WiMAX Forum Network Architecture, release 1.2, stage 2 and stage 3 may be adopted to achieve seamless handover from a fBS to another fBS or to a MBS without further modification. This procedure may be similar to a MBS to MBS handover. However, handover from a MBS to a fBS may require certain modifications in order to achieve seamless handover.

The introduction of femto base stations creates a challenge to ensure seamless handover from a MBS to a fBS. The coverage area of a fBS is generally small as compared to the coverage area of a MBS. In general, there may be a large number of fBSs in an area served by a MBS and thus a much larger number of fBSs than MBSs. Neighbor topology advertisement utilizes information received by a fBS or MBS from its ASN gateway. The information may include PHY parameters of the target base station of the handover and may be broadcast by the currently serving base station in a neighbor advertisement (MOB_NBR-ADV) message. MS scanning has MS 306 scanning the frequency channels for the existence of possible handover base stations. Currently, a serving MBS may broadcast a MOB_NBR-ADV message with information regarding nearby MBSs that are available for MS 306 to be handed over. Incorporating fBSs into a neighbor topology advertisement would be bandwidth intensive and the neighbor advertisement message in the WiMAX standard is limited to 256 stations. Thus it may be impossible to incorporate all fBSs into a single MOB-NBR-ADV message.

And unlike MBSs that need to serve any MS, fBSs might only serve a limited set of MSs which belong to a closed subscription group (CSG). There are two types of fBSs: private accessible fBS and public accessible fBS. In the former case, the fBS offers open access to only a closed subscription group (CSG) and does not serve the MSs not belonging to the CSG. For example, the members in a CSG may be the MS devices of the owner of the fBS and/or his/her family/friends/neighbors. On the other hand, the public accessible fBS would serve not only MSs in a CSG, but could be expanded to a group which can be configured either by the owner or the operator, depending on the agreement.

Accordingly, any private fBSs that are included in the MOB_NBR-ADV message are generally useless except to users permitted to use that particular fBS. Other MS users would waste energy and bandwidth in attempting to connect to a private fBS that the MS is not allowed to use. If private fBSs are not included in the MOB_NBR-ADV message, a MS 306 may have to employ a general channel scan to in order to -identify the existence of its home fBS 304. However, the MS 306 would not know the PHY parameters of its home fBS 304. Without knowing the PHY parameters of its home fBS 304, the scanning time required to identify the home fBS 304 may be too long to realize a fast seamless handover.

Therefore, it may be desirable to exclude private fBSs from the MOB_NBR-ADV message broadcast from MBS 302 in order to reduce bandwidth consumption and futile connection attempts. This addresses two of the concerns mentioned above. Various embodiments of the invention may provide the ability to achieve a fast seamless handover while allowing MS 306 to identify the existence of home fBS 304.

During the association establishment phase as illustrated by FIG. 3A, it is assumed that MS 306 is currently being served by its home fBS 304. In general, as described above, the procedure for handing over MS 306 from its home fBS 304 (or any other serving fBS) to a MBS 302 may be fairly straightforward as the MOB_NBR-ADV message containing the information necessary to connect to nearby MBSs 302 may be performed using current techniques. However, in order to facilitate a seamless handover of MS 306 from its home MBS 302a to its home fBS 304, additional steps may be taken.

In FIG. 3A, it is assumed that MS 306 is connected to its home fBS 304 and is illustrated as leaving the coverage area of its home fBS 304. Therefore, a handover from fBS 304 must be made to a neighboring base station. In this example the handover is to home MBS 302a of MS 306. During the handover process, fBS 304 generates a handover confirmation (HO_CNF) message and communicates the message to ASN gateway 310a associated with fBS 304, as indicated by arrow 308a. Under the WiMAX Forum Network Architecture, release 1.2, stage 2 and stage 3, MS' 306 identification is included in the HO_CNF message. A modification to the HO_CNF message may be made to include information such as home fBS' 304 base station identification, which may include PHY parameters, and an operation code to create an association at ASN gateway 310a. This modified HO_CNF message that includes fBS information is denoted as a HO_CNF* message. It is this modified HO_CNF* message that is generated and sent from fBS 304 to ASN gateway 310a and not the unmodified HO_CNF message described above. Although this has been described with respect to a HO_CNF message, any message that includes identification information of the fBS 304 and MS 306 may be utilized.

At ASN gateway 310a, the operation code included in the HO_CNF* message may cause the storage of home fBS' 304 information and association with a particular MS' 306 identification. In the illustrated example, each base station may be served by a different ASN gateway 310, thus, HO_CNF* message may be initially received by ASN gateway 310a which serves home fBS 304. ASN gateway 310a may store the identification information of home fBS 304 and its association with MS 306.

The information regarding home fBS 304 and its association with MS 306 may also be propagated to the ASN gateway associated with the base station receiving the handover if it is served by a different ASN gateway 310. The receiving base station may be referred to as the targeted base station. In the illustrated example, ASN gateway 310b is associated with home MBS 302a. Thus, HO_CNF* message may be sent to ASN gateway 310b, as indicated by arrow 308b. Upon receipt of the HO_CNF* message, information associating home fBS 304 with MS 306 may be stored at ASN gateway 310b. An unmodified HO_CNF message 310c may be sent to MBS 302a to complete the handover process for MS 306 from fBS 304 and MBS 302a, as indicated by arrow 308c. Alternatively, in certain embodiments, the HO_CNF* message may be sent to MBS 302a and the association information may be stored at MBS 302a in addition to or in lieu of storing the association information at ASN gateways 310. Thus, the message indicated by arrow 308c may be a HO_CNF* message. The association information may be stored for a certain period of time before the association information is purged. The period of time may be reset upon receipt of another HO_CNF* message. Otherwise, the association information may be purged after the period of time expires.

FIG. 3B illustrates a technique for using the association information from FIG. 3A. Once association information is established at ASN gateways 310, MS 306 may be recognized by ASN gateways 310 when it returns to its home base stations. Alternatively, in certain embodiments, the association information is stored at MBS 302 and MS 306 is recognized when it returns to MBS 302. Distribution of the association information allows MS 306 to obtain the PHY parameters of its home fBS 304 upon return to its home MBS 302a allowing it to scan for home fBS 304 to eventually permit a handover from home MBS 302a to home fBS 304.

During the information distribution phase, a MS 306 becomes served by its home MBS 302. This may occur when MS 306 is turned on within the coverage area of home MBS 302. Alternatively, this may occur when MS 306 is being handed off to its home MBS 302a from a neighboring MBS 302. As an example, this event may occur because the owner of MS 306 is returning home from work or errands. Regardless of how MS 306 becomes served by MBS 302, the method described below may occur.

In FIG. 3B it is assumed that MS 306 is being handed over to MBS 302a from another MBS 302. Thus, as illustrated in FIG. 3B, MS 306 is leaving the coverage area of MBS 302e and entering the coverage area of home MBS 302a. Previously, a standard handover procedure would take place where a neighboring MBS 302 simply hands over service of MS 306 to home MBS 302a. In the illustrated example, MBS 302e initiates the handover procedure. The procedure includes sending a HO_CNF message from MBS 302e to its serving ASN gateway 310a, as indicated by arrow 308d. This HO_CNF message may have a standard content and contain MS' 306 identification. ASN gateway 310a may forward MS' 306 identification to ASN gateway 310b using a HO_CNF message, as indicated by arrow 308b, because ASN gateway 310b serves handover target MBS 302a.

ASN gateway 310b may check to see if the received MS 306 identification corresponds with the identification of any MS 306 that are stored at ASN gateway 310b which identifies the particular MS 306 as associated with MBS 302a as a home MBS. In the illustrated example, the identification of this particular MS 306 matches information stored at ASN gateway 310b. Upon identification that MS 306 matches with an entry in ASN gateway 310b for home MBS 302a, additional steps are taken.

First, ASN gateway 310b may send a modified HO_CNF message to home MBS 302a, as indicated by arrow 308f. The modified HO_CNF message may include information relating to home fBS 304 including the PHY parameters of home fBS 304 and an operation code to unicast a neighbor advertisement (MOB_NBR-ADV) message to the particular MS 306. This modified HO_CNF message may be denoted as a HO_CNF** message.

Home MBS 302a may compose a customized MOB_NBR-ADV message upon receiving the HO_CNF** message. The customized MOB_NBR-ADV message may include the PHY parameters of home fBS 304. The customized MOB_NBR-ADV message is scheduled to be delivered via a unicast message to MS 306, as indicated by arrow 312. When MS 306 receives the unicast MOB_NBR-ADV message, MS 306 may begin scanning for its home fBS 304. By including the PHY parameters of home fBS 304 scanning time may be shortened.

In certain embodiments, if the association information was stored by MBS 302a, then upon handover of MS 306 to MBS 302a, MBS 302a may determine if MS 306 matches with an entry stored at MBS 302a that identifies MBS 302a as a home MBS 302 for MS 306. If a match occurs, then MBS 302a may access the stored association information and unicast a customized MOB_NBR-ADV message to MS 306 that may include the PHY parameters of home fBS 304.

Figure 4A:
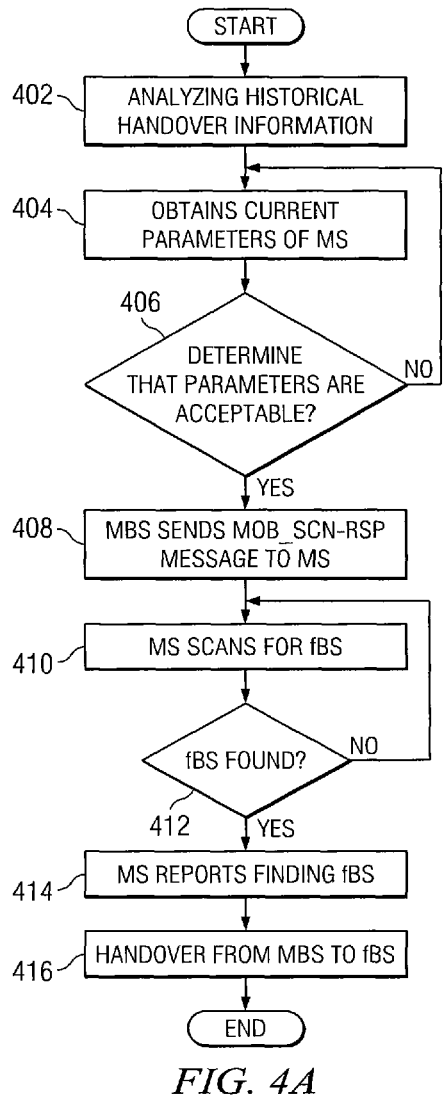
FIGS. 4A and 4B are flowcharts illustrating example methods for reducing the amount of scanning time to achieve a seamless handover between a macro base station and privately accessible femto base stations in a WiMAX system.
Figure 4B:
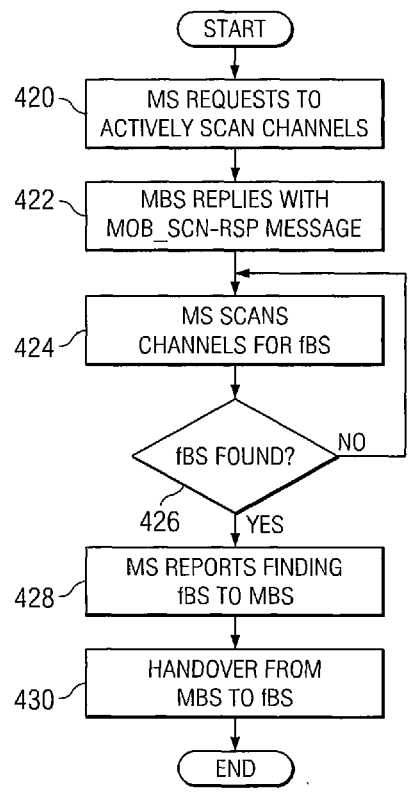

FIGS. 4A and 4B are flowcharts illustrating example methods for reducing the amount of scanning time to achieve a seamless handover between a macro base station and privately accessible femto base stations in a WiMAX system. These methods may refer to components illustrated in FIGS. 3A and 3B to provide examples of the processes. As illustrated in FIGS. 3A and 3B the coverage area of MBS 302a is bigger than the coverage area of fBS 304. Thus, while MS 306 is within the coverage area of MBS 302a, it may not be within the coverage area of fBS 304. In general, MS 306 would need to scan for the presence of home fBS 304 in order for MS 306 to be eventually handed over to fBS 304 for servicing. FIG. 4A illustrates a MBS 302a triggered scanning process and FIG. 4B illustrates a MS 306 triggered scanning process. The method illustrated in FIGS. 4a and 4b assume that the processes described in FIGS. 3A and 3B have occurred.

In FIG. 4A at step 402, MBS 302a or ASN gateway 310b may analyze historical information relating to the handover process. This information could include the last serving base stations for a MS 306 associated with home fBS 304 before handover to home MBS 302a, or MS' 306 CINR level when home MBS 302a 1) receives an MOB_MSHO-REQ from MS 306, 2) sends an MOB_BSHO-REQ, or 3) receives an MOB_HO-IND from MS 306. Some of these messages may be sent during a handover process as MS 306 is handed over from home fBS 304 to MBS 302a. It may be reasonable to conclude that if the current CINR level is comparable to the CINR level when MS 306 was handed over from home fBS 304 to MBS 302a, then MS 306 may be near to home fBS 304. If MS 306 is close to home fBS 304, then it may be preferable to handover the service of MS 306 to home fBS 304 from MBS 302a. Thus, at step 404, MS' 306 current parameters, for example, CINR level, may be obtained. At step 406, if it is determined that the desired parameters are within an acceptable variance, for example, within 5% or 10%, or a standard deviation or two of the stored historical CINR level, then home MBS 302a sends an unsolicited MOB_SCN-RSP message to MS 306. This predetermined variance may change depending on the expected mobility of MS 306. For example, if MS 306 is in high mobility, or moving through MBS' 302 service area quickly, scanning may begin at two standard deviations from the stored historical CINR level. Whereas if MS 306 is in low mobility, scanning may begin at one standard deviation from the stored historical CINR level.

Alternatively a simple threshold based method may be used by home MBS 302a to determine when to initiate the unsolicited MOB_SCN-RSP message. For example, home MBS 302a may determine that the current state of MS' 306 CINR level is above or below a certain threshold, for example 10 db. If the desired parameters are not within an acceptable variance, the method returns to step 404 to obtain further updates to MS' 306 parameters. A delay, for example, 15 seconds, could be implemented between the obtaining another current parameter reading.

At step 408 an unsolicited MOB_SCN-RSP message from MBS 302a is sent to MS 306 to instruct it to begin scanning for home fBS 304. In response to this message MS 306 begins scanning for fBS 304 at step 410. MS 306 may scan for home fBS 304. At step 410, if home fBS 304 is not found, MS 306 may continue scanning or wait a period of time before recommencing the scanning process. If home fBS 304 is found, the process moves to step 414. At step 414, MS 306 reports to its serving MBS, in this example, home MBS 302a, that it is within range of fBS 304. At step 416, a handover process is initiated and service of MS 306 is handed over from home MBS 302a to home fBS 304.

FIG. 4B illustrates a MS 306 initiated scanning process. At step 420 MS 306 requests to actively scan channels for home fBS 304 using a MOB_SCN-REQ message. For example, MS 306 may, upon entering home MBS 302a request to begin scanning for home fBS 304. Alternatively, MS 306 may determine that it is in a low mobility mode and may seek to be handed over to a fBS 304. As another example alternative, MS 306 may, upon receiving the MOB_NBR-ADV message denoted by arrow 312 request to periodically scan channels to actively search for handover possibilities. Active scanning generally entails having MS 306 search frequencies for the existence of base stations. Optionally at step 422, home MBS 402a could reply with a MON_SCN-RSP message to specify an event-triggered report mode. This may prevent MS 306 from sending reports that indicate it has not found home fBS 304, avoiding unnecessary consumption of bandwidth. At step 424, MS 306 begins scanning for fBS 304.

At step 426, MS 306 determines whether it is within range of fBS 304. At step 428, if MS 306 is not within range of fBS 304, MS 306 may continue scanning for fBS 304 or wait a period of time before continuing the scanning process. If instead, MS 306 is in range of fBS 304, MS 306 reports to its serving MBS, in this example, home MBS 302a, that it is within range of fBS 304. At step 430, a handover process is initiated and service of MS 306 is handed over from home MBS 302a to home fBS 304.

Although various embodiments have been described with certain types of components and messages, other suitable components and formats of messages could be used without departing from the scope of the invention. Further, although WiMAX is used as an example, other types of wireless networks utilizing fBSs are contemplated.

What is claimed:

1. A method, comprising,
   receiving a handover request for a femto base station serving a mobile station to handover service of the mobile station to a macro base station;
   receiving a handover confirmation message including identification information and physical layer (PHY) parameters of the femto base station and an operation code to store association information and the identification information for the femto base station;
   in response to receiving the handover request, creating the association information by associating the identification information for the femto base station with the mobile station; and
   storing the identification information for the femto base station and the association information at the macro base station or an access service network gateway.

2. The method of claim 1, wherein the identification information for the femto base station includes the physical layer (PHY) parameters associated with the femto base station.

3. The method of claim 1, further comprising: storing the identification information for the femto base station and the association information at a first access service network gateway serving the femto base station; and transmitting the stored association information and the stored identification information from the first access service network gateway serving the femto base station to a second access service network gateway serving the macro base station.

4. The method of claim 1, further comprising:
   purging the stored identification information and association information after a predetermined period of time has elapsed.

5. The method of claim 1, wherein the identification information for the femto base station and the association information is transmitted in a handover confirmation message.

6. A method, comprising:
   receiving a handover request for a mobile station to be handed over to a first macro base station from a second macro base station, the first macro base station being a home macro base station of the mobile station;
   receiving identification information for the mobile station;
   comparing the mobile station identification information with stored association information comprising:
   identification information of a femto base station; and
   identification information for the mobile station;
   identifying that the mobile station identification information matches the stored association information; and
   generating a handover confirmation message, the handover confirmation message including physical layer (PHY) parameters of the femto base station and an operation code for the first macro base station to communicate the PHY parameters of the femto base station to the mobile station.

7. The method of claim 6, further comprising:
   communicating a neighbor advertisement message comprising the identification information and PHY parameters of the femto base station to the associated mobile station.

8. The method of claim 6, further comprising:
   initiating a mobile station scan for the femto base station; and
   handing over service of the mobile station from the first macro base station to the femto base station.

9. The method of claim 8, wherein the mobile station scan is initiated when a current parameter is within a predetermined variance of a historical handover parameter.

10. The method of claim 9, wherein the current parameter is a current CINR level of the mobile station and the historical handover parameter is a CINR level of the mobile station when the mobile station was handed over from the femto base station to the first macro base station.

11. The method of claim 8, wherein the mobile station scan for the femto base station is initiated by the mobile station.

12. The method of claim 6, wherein the information regarding the femto base station includes PHY parameters of the femto base station.

13. The method of claim 6, wherein the information for the femto base station and the association information is communicated from an access service network gateway.

14. A wireless communications system, comprising:
   a first access service network gateway, the first access service network gateway configured to:

receive a handover request for a femto base station serving a mobile station to handover service of the mobile station to a macro base station;

receive a handover confirmation message, the handover confirmation message including identification information and physical layer (PHY) parameters of the femto base station, and an operation code to store association information and identification information for the femto base station;

in response to receiving the handover request, create the association information by associating the identification information for the femto base station with the mobile station; and store the identification information for the femto base station and the association information.

15. The system of claim 14, wherein the first access service network gateway is further configured to: transmit the association information and the identification information from the first access service network gateway serving the femto base station to a second access service network gateway serving the macro base station.

16. A system, comprising: an access service network gateway, the access service network gateway, configured to: receive a handover request for a mobile station to be handed over to a first macro base station from a second macro base station, the first macro base station being a home macro base station of the mobile station; receive identification information for the mobile station; compare the mobile station identification information with stored association information comprising identification information of a femto base station and identification information for the mobile station; identify that the mobile station identification information matches the stored association information; and generate a handover confirmation message, the handover confirmation message including physical layer (PHY) parameters of the femto base station, and an operation code for the first macro base station to unicast the PHY parameters of the femto base station to the mobile station.

17. The system of claim 16, wherein the access service network gateway is further configured to: cause to be initiated a mobile station scan for the femto base station; and process a handover request for the mobile station to be handed over from the first macro base station to the femto base station.

* * * * *